Patented July 6, 1943

2,323,504

UNITED STATES PATENT OFFICE 2,323,504

PREPARATION OF OMEGA-ACYL-AZOLES

Cyril D. Wilson, Metuchen, N. J., assignor, by mesne assignments, to E. I. du Pont de Nemours & Company, Wilmington, Del., a corporation of Delaware No Drawing. Application November 10, 1939, Serial No. 303,873

5 Claims. (Cl. 260—307)

This invention relates to a process for preparing omega-acyl-azoles. More particularly, it relates to a novel process of preparing such compounds from acyl acetic acid esters and aromatic primary amino compounds containing a hydroxy mercapto and seleno-mercapto or telluro-mercapto group in the ortho position to said amino group. Still more particularly, it relates to such a process wherein the reaction is carried out in an inert solvent medium under reflux conditions.

This invention has for an object the provision of a new class of color formers which may be used in developer solutions and emulsions. A further object is to provide new color formers which can be economically made from readily available chemical compounds. A still further object is the production of developing solutions and emulsion layers containing color formers which form dyes of good tinctorial strength and color. A still further object is the production of color formers which do not affect the sensitivity of photographic emulsions. Still other objects will be apparent from the following specification.

The above and other objects are accomplished by the preparation and use in photographic emulsions and processing solutions especially developing solutions of azole compounds containing a —CH₂CO— group directly attached to the azole nucleus through the methylene radical.

In one important embodiment of the invention the compounds have the general formula:

(1) 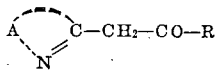

wherein A constitutes the atoms necessary to complete an azole ring, e. g. an oxazole, thiazole, selenazole, or tellurazole and R represents an aliphatic, cycloaliphatic, aromatic, heterocyclic, or mixed hydrocarbon radical, and their substitution products.

In a more preferred form of the embodiment just described, the azole contains two or more rings. These compounds may be represented by the general formula:

(2) 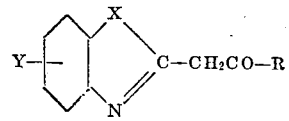

wherein R has the same significance as in Formula 1 X is an atom from the oxygen family, or chalcogen consisting of oxygen, sulfur, selenium and tellurium, (the term chalcogen has been adopted as a generic term to cover the elements oxygen, sulfur, selenium, and tellurium. See the Journal of the American Chemical Society, vol. 63, page 889), and Y is hydrogen, alkyl of 1 to 20 carbon atoms, e. g. ethyl, methyl, dodecyl, octadecyl, etc. including straight chain iso and branched chain alkyl radicals, cycloalkyl, e. g. cyclohexyl methyl, cyclohexyl ether, cyclohexyl menthyl, etc., aryl, e. g. phenyl, naphthyl, chlorphenyl, bromnaphthyl, aralkyl, e. g. benzyl, methylbenzyl, menaphthyl, etc., carboxylic acyl, including aliphatic acyl, e. g. acetyl, butyroyl, lauroyl, stearoyl, caproyl, etc., heterocyclic acyl, e. g. thienoyl, nicotinoyl, isonicotinoyl, etc., cyclic acyl, e. g. benzoyl naphthoyl, etc., preferably containing at least 6 carbon atoms, alkoxy, e. g. methoxy, ethoxy. The benzene nuclei of the above furthermore may have one or more water-insolubilizing groups, e. g. hydrocarbon alkoxy, halogen, e. g. chlorine, bromine; nitro, amino, or water solubilizing groups such as hydroxyl, carboxylic, sulfonic, etc. groups.

The compounds wherein X represents oxygen and sulfur constitute the preferred embodiments hereof. The dyes formed are of good color and stability. The relative ease of their preparation and the fact that the starting materials or intermediates are more readily available are also of significance.

In preparing certain of the novel color-formers hereof, one mol of an acylacetic acid ester is reacted with about one mol of an aromatic primary amino compound containing a hydroxy, mercapto, selenomercapto, or telluromercapto group in the ortho position, to form azole in an inert solvent medium under reflux conditions until condensation occurs. The mixture is cooled, filtered, and distilled or recrystallized depending upon its nature.

The acyl radicals of the acylacetic acid esters used are not limited to any one type of compounds. Thus, they may be derived from or correspond to various aliphatic, isocyclic and heterocyclic monobasic, monocarboxylic acids. Among the radicals falling within this class mention may be made of the following: acetyl, butyryl, decanoyl, benzoyl, 4-chlorobenzoyl, 4-nitrobenzoyl, alphanaphthoyl, furoyl, thienoyl, picolinoyl, nicotinoyl and isonicotinoyl. Further, it is to be understood that when the acyl radicals contain benzene nuclei the latter may be substituted by various non-water-solubilizing groups such as hydrocarbon alkoxy, halogen, nitro and amino groups and/or water-solubilizing groups such as sulfonic and sulfonate and carboxylic and carboxylate groups. The acyl acetic acid esters may contain up to 24 carbon atoms or more. The higher molecular weight radicals are advantageous in some cases because the resulting color formers are more immobile than when lower radicals are present. As examples of representative suitable esters, mention is made of ethyl acetoacetate, methyl acetoacetate, ethyl dodecoylacetate, ethyl benzoylacetate, ethyl picolinylate, ethyl para-nitro-benzoyl acetate.

The compounds may be prepared by reacting a carboxylic acylacetic acid ester with an equivalent amount of an aromatic amino compound containing in an ortho position thereto an —OH, —SH, —SeH, or —TeH group. Their preparation may be exemplified in terms of the following equation wherein ortho amino-phenol is reacted with ethyl dodecanoyl acetate.

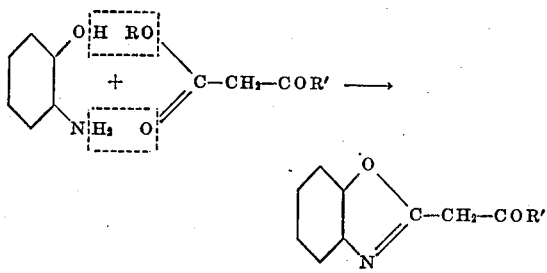

wherein R is an ethyl radical and R'CO— is a dodecanoyl radical.

The reaction may be accomplished by dissolving or suspending the two reactants in an inert organic solvent, preferably a volatile hydrocarbon solvent such as xylene, and heating the mixture under reflux for several hours until ring closure obtains. The mixture is cooled, filtered and the product recrystallized or distilled depending upon its nature.

In another embodiment of the invention the compounds have the general formula:

(3) 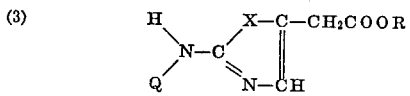

wherein X is an oxygen, sulfur, selenium or tellurium atom, R is an aliphatic hydrocarbon radical and Q is hydrogen or a hydrocarbon carboxylic acyl radical. R may thus be a primary, secondary or branched chain alkyl radical containing from 1 to 24 carbon atoms or cycloaliphatic, e. g. cyclohexyl, cyclopentyl, abietyl, tetrahydroabietyl, naphthenyl, phenyl, etc., and Q may be an acyl radical corresponding to fatty acids having from 1 to 24 carbon atoms, benzoyl, nitrobenzoyl, chlorobenzoyl, etc.

The compounds of Formula 3 wherein Q is hydrogen may be prepared by reacting a 4-halogeno acetoacetic acid ester with a thiourea in the presence of an organic solvent at a temperature below 100° C. The product is neutralized with a weak alkaline solution and recrystallized from an organic solvent. These products may be reacted with an acylating agent to form amides with the amino group.

The methylene azoles may be incorporated in developer solutions by dissolving them in a suitable solvent and adding it to the solution with stirring. They may be added to emulsions e. g. silver halide emulsions in a similar manner. In some cases the use of dispersing agents such as alkylated naphthalene sulfonates, higher aliphatic fatty alcohol sulfates, higher aliphatic sulfonates, mineral oil sulfonates, Turkey red oil, etc. is advantageous.

The invention will be further illustrated but is not intended to be limited by the following examples:

Example I

One mol of the ethyl aceto-acetate is dissolved in xylene and one mol of o-aminothiophenol is added to the boiling mixture. The mixture is refluxed for 2 to 3 hours at a temperature of about 140° C., cooled, filtered and the resulting product purified.

Example II

One mol of ethyl benzoyl acetate is dissolved in xylene and one mol of o-amino-phenol is added with stirring to the boiling mixture. The reaction mixture is heated to under reflux at a temperature of 200° C. for several hours. The solution is chilled and the crystals recrystallized.

In place of the specific amino compounds of the above examples may be substituted various other aromatic compounds containing an amino group and a reactive hydrogen atom attached to an atom from the oxygen family of elements. Thus o-amino bromophenol, o-amino chlorphenol, o-amino bromothiophenol, o-amino chlorothiophenol, o-amino nitrophenol, o-amino selenophenol, o-amino-tellurophenol, etc. may be substituted in similar amounts.

Example III

One mol of 4-bromoacetoacetic acid ethyl ester is mixed with one mol of thiourea in dry ethanol and heated on a steam bath for several hours. It is neutralized with sodium carbonate, diluted with water, filtered and recrystallized from benzene and ether. It has a melting point of 94° C.

Example IV

To the ethyl-4-(2-amino thiazolyl) acetate of Example III in benzene is added a mol of benzoyl chloride. The mixture is heated for several hours. The solution is washed with excess 10% sodium carbonate solution and the benzene evaporated. The product is an oil.

Various types of esters can be substituted for the specific ones set forth in the above examples. Thus, the esters from methyl, isopropyl, butyl, hexyl, octyl, dodecyl, etc., cyclohexyl, abietyl, naphthenyl, benzyl, etc. alcohols may be used. In general the higher molecular weight alcohols are preferred because they render the color formers less mobile in the emulsion layers.

As examples of suitable solvents which may be substituted for the xylene are petroleum, benzene, toluene, etc.

The compounds or mixtures are introduced into photographic emulsion layers or developer solutions as previously described and dyes produced therefrom by some suitable treatment such as exposure and development with a color coupling developer or treatment with a diazo compound followed by localized bleaching of the dye in the image areas. In the case of emulsions the color-formers are dissolved in alkali or carbonate solutions. Small amounts of organic solvents, e. g. alcohol or acetone may be used. The remaining examples are directed to their use in various photographic compositions and to processes of developing dyed images utilizing such compounds.

Example V

To 100 ccs. of 2% by weight aqueous gelatin solution is added a solution consisting of 8 ccs.

of ethyl alcohol and 1 gram of the compound having the formula:

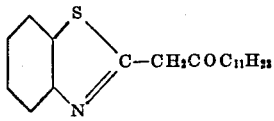

The total weight of the combined solution is then brought to about 150 grams with water and then the mixture is added to 100 grams of a gelatino-silver halide emulsion and mixed thoroughly. The resulting emulsion may then be coated upon a suitable support such as paper, glass or a cellulose derivative base, or upon another photographic emulsion layer which may or may not be another color-forming dye component. After exposure directly in a camera or by printing through appropriate color records, the film is developed in a non-color-forming developer. The reversed image is then developed by means of an alkaline solution of diethyl-p-phenylenediamine, whereupon a light red-orange dye of good strength and color forms in situ with metallic silver.

Furoylaceto-p-chlor-o-phenitidine gives similar results when substituted in similar amounts.

*Example VI*

To 100 ccs. of 2% by weight aqueous gelatin solution is added a solution consisting of 8 ccs. of ethyl alcohol and 1 gram of the compound having the formula:

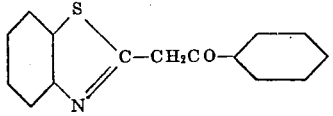

The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example V. After exposure, the photographic element is developed in an alkaline solution containing diethyl-p-phenylene diamine whereupon a red-orange dye of good tinctorial strength is formed.

*Example VII*

To 100 ccs. of 2% by weight aqueous gelatin solution is added a solution consisting of 8 ccs. of ethyl alcohol and 1.5 grams of the compound having the formula:

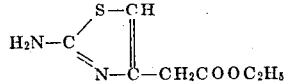

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

*Example VIII*

To 100 ccs. of 2% by weight aqueous gelatin solution consisting of 8 ccs. of ethyl alcohol and 1.5 grams of the compound having the formula:

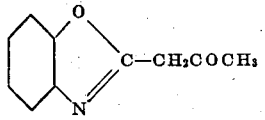

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example V. After exposure the photographic element is developed in an alkaline solution containing dimethyl-p-phenylene diamine, whereupon a greenish-yellow dye light in color and of good tinctorial strength is formed.

The 6-nitro derivative which has a melting point of 255°–6° C. gives similar results forming an orange dye upon development.

*Example IX*

To 100 ccs. of a developer having the following composition:

Diethyl-p-phenylenediamine hydro
  chloride_____g__   2
Sodium sulfite (anhydrous)_____g__   5
Sodium carbonate (anhydrous)_____g__  20
Water_____cc__ 1000 are added from 0.1 to 1.0 gram of omega acetyl-2-methyl-benzothiazole (compound of Example I) dissolved in a few ccs. of ethyl alcohol. An exposed photographic element containing exposed silver salts is then developed in aforedescribed solution.

The color formers hereof may be used with various types of emulsion and are especially useful in the development of gelatino silver halide emulsions such as silver chloride, silver bromide, silver chloro-bromide, silver bromide-iodide, etc. emulsions. They may be used with latent images or reversed or bleached images and form dyes in situ with metallic silver. Upon removal of the silver transparent dye images are left.

The dye intermediates used in this invention are not limited in their utility to any one process of color photography. They are suitable for dye coupling development with p-phenylenediamine derivatives, and by suitably controlling the molecular weights of the products, they may be used in the color developer or in the photographic emulsion. Furthermore, the dye components of this invention couple with diazo compounds, e. g. tetrazotized dianisidine, so that they are therefore suitable for transforming into azo dyes, followed or not by differential bleaching in the presence of silver images as is known in the art. They may be used in multilayer or single layer films.

The preferred developing agents in the process of dye coupling development are derivatives of p-phenylenediamine and particularly the asymmetric dialkyl p-phenylenediamines, e. g. p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylenediamine, chloro-p-phenylenediamine, 1,2,5-tolylenediamine, 2-amino-5-diethylamino-toluene, N-p-aminophenylpiperidine, N-methyl-N-hydroxyethyl-p-phenylene diamine, N-butyl-N-hydroxyethyl-p-phenylenediamine, β-γ-dihydroxypropyl-p-phenylenediamine, 2-amino-5-(N-β-hydroxy-ethyl-N-butyl)aminotoluene and its dihydrochloride, etc. These aromatic amino-developing agents may be used in the form of their salts, which may be either inorganic or organic. The salts are in general more stable than the free bases. As examples of suitable salts mention is made of the hydrochloride, sulfates, acetates, etc.

As many apparently widely different embodiments of this invention may be made without departing from the spirit and scope thereof it is to be understood that I do not limit myself to the specific embodiments herein except as defined by the appended claims.

I claim:
1. The process which comprises reacting an acyacetic acid ester of the general formula: R—CO—CH₂COOR' with an aromatic amino compound of the general formula:

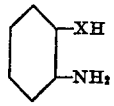

wherein the above formula R—CO is an organic acyl radical, R' is a hydrocarbon radical and X is a chalcogen.

2. The process which comprises reacting about one mole of an acylacetic acid ester of the general formula:

with about one mol of an aromatic amino compound of the general formula:

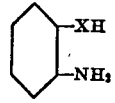

wherein the above formula R—CO is an organic acyl radical, R' is a hydrocarbon radical and X is a chalcogen, and recovering an omega-acyl-2-methyl azole.

3. A process as set forth in claim 2 wherein the reaction is carried out in an inert solvent medium under reflux conditions.

4. The process which comprises reacting an acyl acetic acid ester of the general formula:

R—CO—CH₂COOR' with an aromatic amino compound of the general formula:

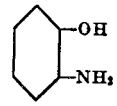

wherein R—CO is an organic acyl radical and R' is a hydrocarbon radical.

5. The chemical compounds of the general formula:

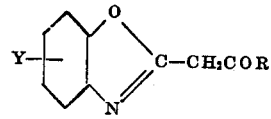

wherein R—CO is an acyl radical and Y is a member taken from the group consisting of hydrogen, alkyl, cycloalkyl, aryl, aralkyl, alkoxy, halogen, nitro and amino groups.

CYRIL D. WILSON.